United States Patent
Hartman

(10) Patent No.: US 6,322,299 B1
(45) Date of Patent: Nov. 27, 2001

(54) END MILL HOLDER

(75) Inventor: David Hartman, Dundee, NY (US)

(73) Assignee: Parlec, Inc., Fairport, NY (US)

( * ) Notice: Subject to any disclaimer, the term of this patent is extended or adjusted under 35 U.S.C. 154(b) by 0 days.

(21) Appl. No.: 09/594,418

(22) Filed: Jun. 16, 2000

(51) Int. Cl.$^7$ .................................................. B23B 31/02
(52) U.S. Cl. .................. 409/141; 74/573 R; 408/143; 408/238; 409/234
(58) Field of Search .................................. 409/141, 232, 409/234; 408/143, 238, 239 R; 74/573 R, 574

(56) References Cited

U.S. PATENT DOCUMENTS

| | | | | |
|---|---|---|---|---|
| 4,865,336 | * | 9/1989 | Keritsis | 409/234 |
| 5,033,923 | * | 7/1991 | Osawa | 409/131 |
| 5,074,723 | * | 12/1991 | Massa et al. | 408/143 |
| 5,096,345 | * | 3/1992 | Toyomoto | 408/239 R |
| 5,125,777 | * | 6/1992 | Osawa | 409/234 |
| 5,407,308 | * | 4/1995 | Takayoski | 409/234 |
| 6,135,684 | * | 10/2000 | Senzaki | 408/143 |
| 6,186,712 | * | 2/2001 | Senzaki | 408/143 |

FOREIGN PATENT DOCUMENTS

660784-A  *  5/1979  (SU)  ..................................  408/143

* cited by examiner

*Primary Examiner*—Daniel W. Howell
(74) *Attorney, Agent, or Firm*—Shlesinger, Fitzsimmons & Shlesinger

(57) ABSTRACT

A rotary machine tool holder has therein intermediate its ends a plurality of balancing screws that are mounted in internally threaded blind bores that extend part way into the holder from equi-angularly spaced points about an outer peripheral surface formed on the holder intermediate its ends, and coaxially of an axial bore in the holder. The screws are adjustable along axes disposed substantially tangentially of the axial bore of the holder, and are prevented from projecting radially beyond the outer peripheral surface of the holder by a plurality of cap screws removably mounted in the holder to have the heads thereof restrict the extent to which the balancing screws can be adjusted toward the outer surface of the holder.

11 Claims, 1 Drawing Sheet

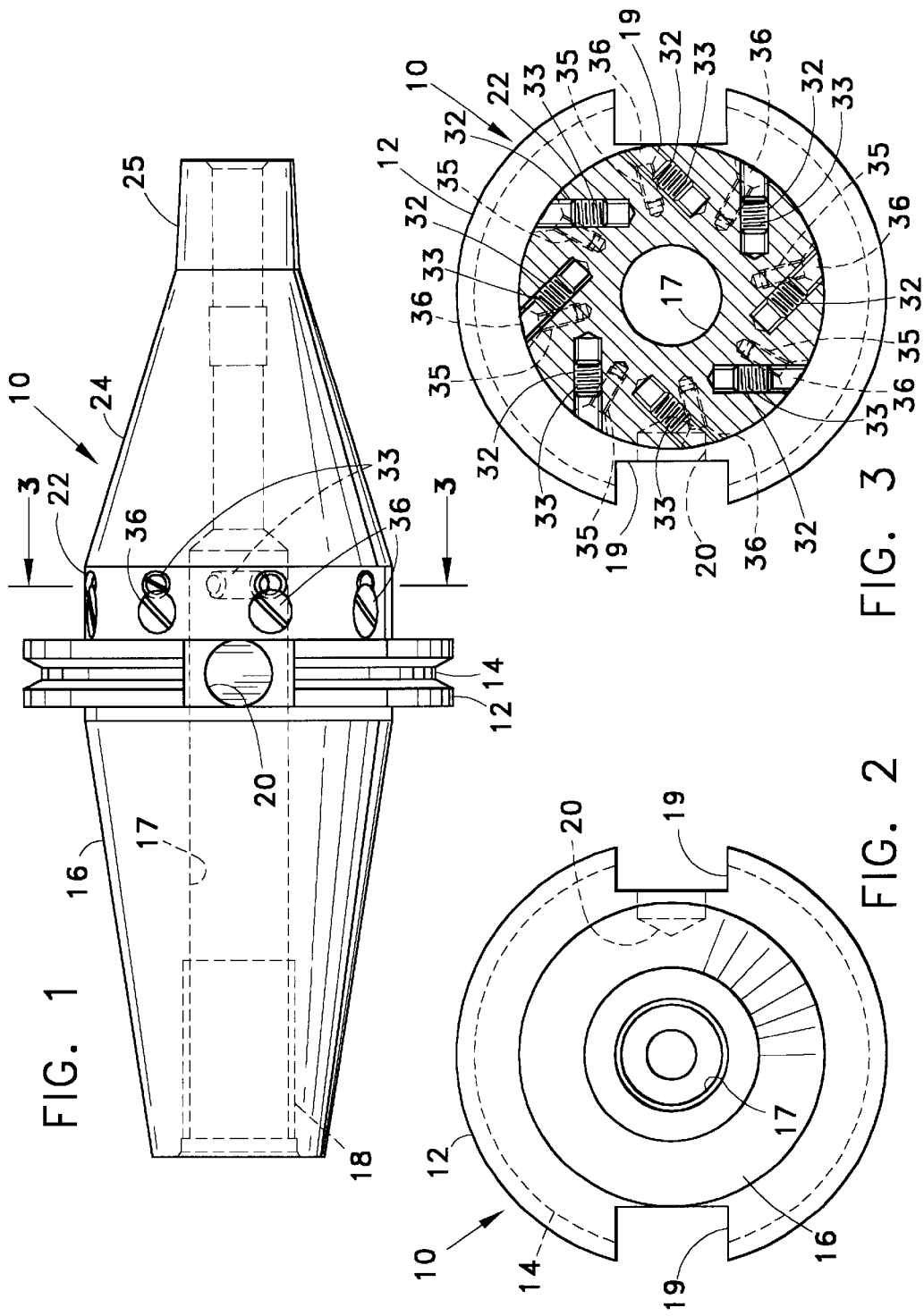

END MILL HOLDER

This invention relates to an improved tool holder, and more specifically to an end mill holder having improved means for balancing and stabilizing a tool during the rotation thereof in a machining operation.

BACKGROUND OF THE INVENTION

Heretofore numerous efforts have been made to improve the operation of a rotary tool, such as for example a rotary end mill tool holder to improve the accuracy of the rotating tool during a machining operation. In many cases, such for example as disclosed in U.S. Pat. Nos. 5,033,923 and 5,125,777 a rotary tool holder has been provided with a plurality of axially extending, internally threaded openings, which are equi-angularly spaced about the axis of the rotary tool holder, and which extend parallel to the axis of the holder. To help maintain uniform rotation of the holder coaxially about its axial centerline, each of the internally threaded openings has removably mounted therein a balancing weight, such as a screw, or the like. Such screws, which are equi-angularly spaced from each other about the axis, are removable and replaceable to stabilize the rotation of the holder during its operation.

A variation of this type of tool holder can be found in U.S. Pat. No. 5,096,345, wherein the tool holder is provided with a plurality of internally threaded openings which are equi-angularly spaced from each other about the axis of the holder, and the axial centerlines of which intersects the axial centerline of the tool holder at equal angles. The tool holder is balanced, not by inserting or removing the screws, but merely by adjusting each screw axially in its associated, internally threaded bore, so that the centrifugal force applied to the tool during its operation can be satisfactorily balanced.

When the above-noted tool holders are to be used, a tool is inserted in the appropriate holder and the assembly is then mounted in a conventional balancing machine which is utilized to detect any undesirable vibration introduced into the tool by virtue of the fact that the tool is unbalanced during rotation. The above-noted weights or screws in the cases of the first two above-noted patents are then inserted or removed until the combined tool and holder are properly balanced. In the case of the third patent, this proper balance is achieved simply by adjusting the screws axially in their respective internally threaded bores.

Among the disadvantages of prior art tool holders of the type noted above is the difficulty in accurately balancing the combined holder and tool assembly, particularly in the case of the U.S. Pat. Nos. 5,125,777 and 5,096,345, since the weights in the associated screw holes must be removed and or replaced by different weights until the desired balance has been achieved. In the case of the U.S. Pat. No. 5,096,345, the screw holes for retaining adjustable weights must have the axes thereof carefully directed to intersect the axial centerline of the holder at a predetermined given angle for each opening.

It is an object of this invention, therefore, to provide an improved, balanceable tool holder which employs a plurality of adjustable weights that are mounted adjustably in internally threaded screw openings that are formed in the outer peripheral surface of the tool holder at circumferentially spaced points about its outer peripheral surface, and which openings have the axes thereof extending tangentially with respect to the axial bore in the tool holder. In this way the weights are readily adjustable axially within their respective openings, and are readily accessible as compared to prior art tool holders of the type described above.

Still another object of this invention is to provide an improved tool holder of the type described in which a plurality of balancing weights are adjustable in internally threaded openings that extend substantially tangentially of the bore of the tool holder and which weights are readily adjustable axially of their respective openings.

Still other objects of this invention will be apparent hereinafter from the specification and from the recital of the appended claims, particularly when read in conjunction with the accompanying drawings.

SUMMARY OF THE INVENTION

A rotary machine tool holder has thereon intermediate its ends an outer peripheral surface disposed coaxially of an axial bore in the holder. A first plurality of spaced, internally threaded blind bores extend part way into the holder from the outer peripheral surface thereof along axes extending substantially tangentially of the axial bore in the holder, and lying in a common plane extending normal to the axis of rotation of the holder. Each of said blind bores has a set screw mounted therein for axial adjustment therein to effect proper balance of the holder during use.

To limit the extent to which the balancing set screws can be adjusted axially toward the outer peripheral surface of the holder, headed cap screws are removably mounted in each of a second plurality of internally threaded blind bores that are formed in the holder adjacent the first plurality of bores, and in such manner that a portion of the head of each cap screw overlies part of the outer end of one of the first plurality of blind bores.

THE DRAWING

FIG. 1 is a side elevational view of an improved, balanceable tool holder made according to one embodiment of this invention;

FIG. 2 is an end view of this tool holder when seen when looking at the left end of the holder as shown in FIG. 1; and FIG. 3 is a sectional view of the tool holder taken generally along the line 3—3 in FIG. 1 and looking in the direction of the arrows.

DETAILED DESCRIPTION OF THE PREFERRED EMBODIMENTS

Referring now to the drawings by numerals of reference, 10 denotes generally a tool holder which is circular in cross section, and which has formed thereon intermediate its ends an enlarged-diameter, circumferential flange 12. Flange 12 has formed therein intermediate its ends a circumferential generally V-shaped groove 14 disposed to be connected, in known manner to an automatic tool changer (not illustrated). Integral with and projecting coaxially from one side of the drive flange 12 (the left side as shown in FIG. 1) is a spindle taper 16 having therethrough an axial bore 17 the outer end of which (the left end as shown in FIG. 1) has therein an internally threaded section 18. In use the spindle taper 16 is held seated in a correspondingly tapered recess formed in a machine drive spindle which has a retention mechanism that threads into the internally threaded recess 18 to secure the holder to the associated drive spindle. Such spindle has a pair of drive dogs (not illustrated) which seat in a pair of rectangular notches 19 formed in diametrally opposite sides of the drive flange 12. One of the notches 19 (the one shown in the right of FIG. 2) has in the bottom thereof a circular orientation notch or recess 20 which is used to keep the holder properly oriented with the drive spindle.

Integral with and projecting coaxially from the side of flange 12 remote from spindle taper 16 is the tool supporting end of the holder comprising a first, circumferential section 22 having an outer peripheral surface the diameter of which is approximately equal to that of the diameter of the spindle taper 16 at its large end, and which section 22 extends axially for a distance approximately equal to the width of the flange 12. Integral with and projecting from the end of the section 22 remote from flange 12 is an elongate, tapered section 24 the end of which remote from section 22 is integral with one end of a reduced-diameter annular tool supporting section 25 which is disposed to have one end of a tool secured in its bore in a conventional manner.

For use in balancing the holder, section 22 of the holder has formed therein eight internally threaded openings or blind bores 32, which open at their outer ends at the outer peripheral surface of section 22 at equi-angularly spaced points about the axis of the holder, and which extend from the outer surface of section 22 partway inwardly of the section 22 and substantially tangentially of the bore 17 in the holder 10. Threaded into each of the bores 32 for axial adjustment therein is a conventional set screw 33 the head of which faces the end of the associated opening 32 that opens on the outer peripheral surface of section 22, so that each screw 33 can be readily adjusted in its associated opening 32. Also extending into the section 22 substantially radially thereof, and adjacent the outer or open end of each of the internally threaded openings 32, is another, but smaller internally threaded opening 35 in each of which smaller openings is removably secured a capping screw 36. The head of each screw 36 seats in the countersunk outer end of its associated opening 35 to overlie a portion of the head of the adjacent adjusting screw 33 when the latter has been threaded into the desired position in a respective opening 32.

In this manner, after the adjusting screws 33 have been adjusted to balance the holder, the capping screws 36 can be threaded inwardly until the heads thereof overlie the heads of the adjusting screws 33, so that the adjusting screws cannot accidentally be adjusted outwardly to the point where the heads thereof project beyond the outer peripheral surface of section 22. To do so would interfere with the automatic tool changing mechanism, so the capping screws 36 purposefully interfere with the ability of any of the adjusting screws to extend beyond the outer peripheral surface of the section 22.

From the foregoing it will be apparent that the present invention provides a relatively simple and inexpensive means for readily and accurately adjusting end mill holders of the type described and claimed herein. With the adjusting screws being positioned tangentially of the bore in the tool holder there is no need to provide screw openings which would have to extend through an end wall of the drive flange 12 or for that matter would have to be positioned carefully to intersect the axis of the tool holder. Also, by adjusting the screws 33, the axial lengths of which are shorter than the depths of the opening 32, the holder cannot only be very accurately balanced, but the torque created thereby can also be adjusted readily. Instead of using the capping screws 36 to prevent undesirable or accidental shifting of screws 33 to a point in which their heads project beyond the outer surface of section 22, this could be achieved by employing an incomplete or crowned or peened thread in the outer end of the opening 32.

While the invention herein has been illustrated and described in detail in connection with only certain embodiments thereof, it will be apparent that it is capable of still further modification, and that this application is intended to cover any such modifications as may fall within the scope of one skilled in the art, or the appended claims.

What is claimed is:

1. A rotary holder for a machine tool, comprising a body having therein an axial bore, and having intermediate its ends an outer peripheral surface disposed coaxially of said bore, means for connecting one end of said body to a tool and the opposite end thereof to the spindle of a machine for rotation thereby coaxially of the axis of said bore, said outer peripheral surface having therein at angularly spaced points thereabout a plurality of circular openings forming the outer ends of a like plurality of internally threaded blind bores extending from said outer peripheral surface part way into said body substantially tangentially of said axial bore, and each of said internally threaded blind bores having a balancing screw axially adjustable therein between opposite ends of the associated blind bore to achieve proper balance of the rotary holder during use.

2. A rotary holder as defined in claim 1, wherein the axes of said blind bores lie in a common plane that intersects the axis of said axial bore at right angles.

3. A rotary holder as defined in claim 1, including means on said body operative to limit the extent to which each of said balancing screws can be adjusted toward said outer end of its associated blind bore.

4. A rotary holder as defined in claim 3, wherein said means comprises a plurality of cap screws equal in number to said balancing screws, and each of said cap screws has a shank section threaded into said outer peripheral surface of said body adjacent one of said blind bores, and has a head section overlying a portion of said outer end of the adjacent blind bore.

5. A rotary holder as defined in claim 4, wherein the axes of said cap screws extend substantially radially of the axis of said axial bore.

6. A rotary holder as defined in claim 5, wherein the axes of said cap screws and the axes of said balancing screws intersect said outer peripheral surface of said body at equi-angularly spaced points about the axis thereof.

7. A rotary holder as defined in claim 5, wherein said head sections of said cap screws seat removably in registering, countersunk recesses formed in said outer peripheral surface of said body adjacent said outer ends of said blind bores.

8. In a rotary machine tool holder disposed to be connected at one end to a machine tool and at its opposite end to the spindle of a machine to be rotated thereby and having therein an axial bore, improved means for balancing said holder during its use, comprising a plurality of spaced, internally threaded blind bores formed in said holder intermediate the ends thereof to open at their outer ends on the exterior of said holder, and to extend part way into said holder along axes that extend substantially tangentially of said axial bore and lie in a common plane extending at right angles to the axis of said axial bore, and a set screw adjustably threaded in each of said blind bores for axial adjustment selectively toward and away from opposite ends of the associated blind bore to achieve desired balance of said holder during use.

9. In a rotary machine tool holder as defined in claim 8, including removable means on said holder positioned to limit the extent to which each of said set screws can be adjusted toward said outer end of its associated blind bore.

10. In a rotary machine tool holder as defined in claim 9, including
- a further plurality of internally threaded blind bores formed in said holder intermediate the ends thereof, and equal in number to the first-named plurality of bores and,
- a cap screw removably mounted in each of said further plurality of bores and having thereon a head a portion of which extends into the outer end of the adjacent outer end of one of said first plurality of bores.

11. In a rotary machine tool holder as defined in claim 10, wherein the axes of said further plurality of axial bores lie in a further common plane positioned adjacent and parallel to said common plane containing the axes of the first-named plurality of blind bores.

* * * * *